H. KURTH.
Grain-Separators.

No. 156,800.

2 Sheets--Sheet 1.

Patented Nov. 10, 1874.

WITNESSES:
G. Mathys
John C. Kenwin

INVENTOR:
H. Kurth
BY
ATTORNEYS.

2 Sheets--Sheet 2.

H. KURTH.
Grain-Separators.

No.156,800.  Patented Nov. 10, 1874.

WITNESSES:
G. Matthias
Solon C. Kemon

INVENTOR:
H. Kurth
BY
Munn & Co.
ATTORNEYS.

UNITED STATES PATENT OFFICE.

HERMANN KURTH, OF MILWAUKEE, WISCONSIN.

IMPROVEMENT IN GRAIN-SEPARATORS.

Specification forming part of Letters Patent No. 156,800, dated November 10, 1874; application filed October 7, 1874.

CASE B.

*To all whom it may concern:*

Be it known that I, HERMANN KURTH, of the city and county of Milwaukee and State of Wisconsin, have invented a new and Improved Machine for Cleaning Grain; and I do hereby declare that the following is a full, clear, and exact description of the same, reference being had to the accompanying drawing forming a part of this specification, in which—

Figure 1:
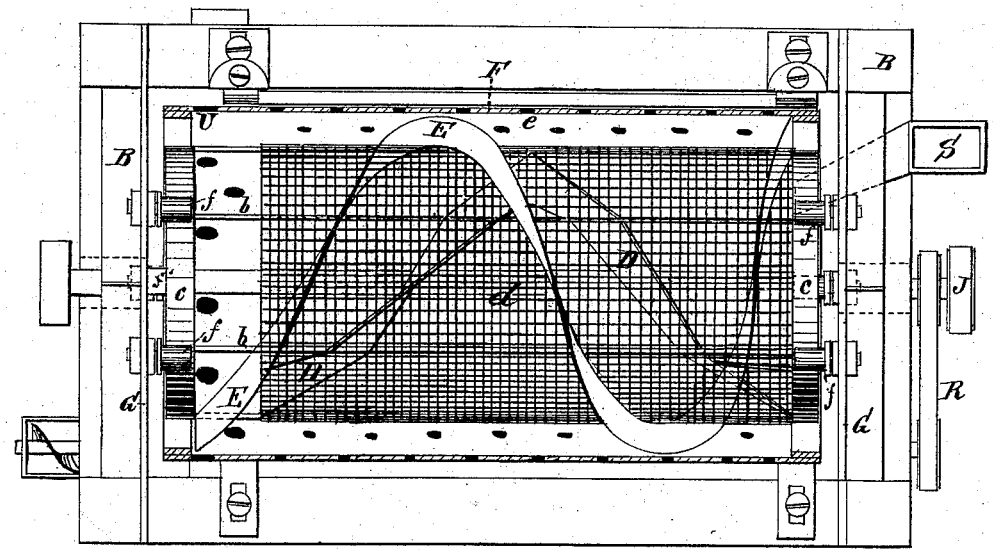
Figure 2:
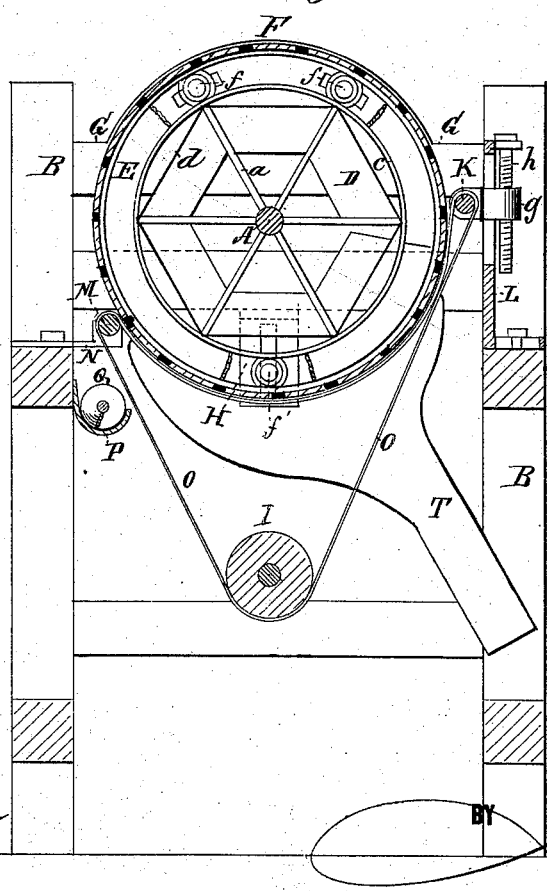
Figure 3:
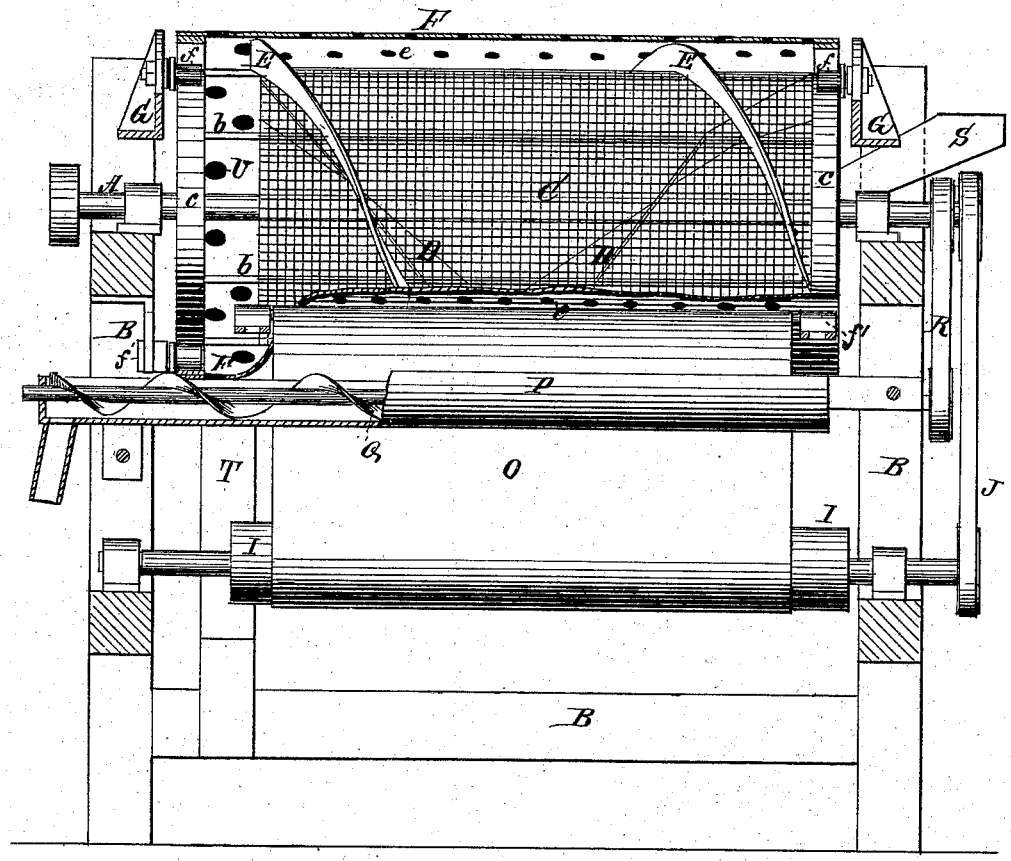

Figure 1 is a plan view with the cylinder in section; Fig. 2, a transverse vertical section through line $x\ x$; Fig. 3, a longitudinal sectional elevation.

This invention relates to certain improvements in machines for cleaning grain of cockle, garlic, and other foreign substances. A shaft provided with an actuating crank and pulley is journaled in a frame-work, and carries upon it a polygonal reel covered with a wire-netting having meshes of a sufficient size to allow the small grains and impurities to pass through, and the large ones to be retained. Upon the inner periphery of said reel is rigidly attached a spiral conveyer, which carries the contents of the reel from the mouth to the delivery, and upon the outer periphery of the reel is another conveyer, which runs parallel with the one upon the inside. Immediately around the said reel, and completely incasing the same, is a metallic cylinder provided with small holes or perforations. Said cylinder rests upon small friction-wheels, which are adjustably fixed in an end plate, and rotate the said cylinder by a frictional contact, the said wheels engaging with a smooth face upon the outside of the reel on one side, and with the inner periphery of the cylinder upon the other, thus rotating the cylinder in an opposite direction from the reel. Just below the cylinder is a roller, which is driven by the main shaft through a band and pulley. Upon one side of the said cylinder, above the center, is a smaller roller, whose journals are fixed in adjustable bearings, and upon the opposite side of the cylinder, below the center, is a similar roller, also journaled in adjustable bearings. Around these two rollers, and the one below, passes a continuous apron, in the belly or sag of which rests the cylinder. The said apron forms for the cavities in the cylinder a removable bottom, which, as it leaves the cylinder and passes around the lower of the small rollers, allows the impurities in the cavities to fall outside the cylinder into a trough, in which is a spiral conveyer driven by the main shaft through a band and pulley.

My invention consists in the construction and arrangement of the above devices, as combined and presented in the claims.

In the drawings, A represents a shaft, provided with an actuating crank and pulley, and journaled in bearings in the frame-work B. Said shaft carries a polygonal reel, C, which consists of the radial stems $a$, ribs $b$, rims $c$, and a covering, $d$, of wire-netting having meshes of a size to retain the large grains, and let the smaller ones pass through. D is a spiral conveyer, which is rigidily attached to the inner periphery of the reel; and E, a similar conveyer attached to the outer periphery of the reel parallel to the first. F is the metallic cylinder incasing the reel, and provided with small holes or perforations $e$. This said cylinder is supported upon two small friction-wheels, $f\ f$, which run upon adjustable journals in the slotted end plates G, which latter are adjustably attached to the frame. These wheels $f$ engage, with a frictional contact, the cylinder upon one side, and the reel upon the other, thus causing the cylinder to revolve in a reverse direction to the shaft and reel. At the bottom of the cylinder is a third wheel, $f'$, similar to the above-mentioned, which revolves upon an adjustable bearing in the slotted support H, by means of which the cylinder is lightly adjusted upon the first two, to insure the requisite amount of friction to rotate the said cylinder. I is a roller just below the cylinder and reel, which is journaled in bearings in the frame-work, and is driven by the main shaft through a band and pulley, J. Upon one side of the cylinder, a little above the center, is a smaller roller, K, which is journaled in the bearings $g$, which latter are adjusted in the support L by means of the slot and screw $h$. M is another roller, on the opposite side of the cylinder, and a little below the center, also journaled in adjustable bearings N. Passing around rollers I K M is an endless apron, O, which is tightly drawn under the belly of the cylinder by means of the adjustment of the rollers K and M. By the side of the roller M, and a little below it, is a trough, P, into which fall the impurities that pass through the cylinder. Said trough contains a spiral conveyer, Q, which is operated by the main shaft through a band and pulley, R. S is a spout, through which the grain is fed to the machine; and T, a chute, which receives the clean grain from the holes U in the cylinder.

The operation of this machine is as follows: The main shaft being set in motion, the grain passes down the spout S into the reel. Now, as the reel revolves, the grain is carried gradually toward the rear by the conveyer D, the small grains and impurities passing, during said passage, through the meshes of the reel, and the large clean grains passing down the reel, and falling over the end of the same into the chute T through the holes U in the cylinder. The small grains and impurities which pass through the reel fall into the bottom of the cylinder, and are caught in the little cavities formed by the perforations in the cylinder and the apron. Now, as the cylinder revolves in the opposite direction, the grain is carried toward the chute T by the conveyer E on the outside of the reel, and, in revolving, the grain and impurities are caught in the little cups and carried up the side of the cylinder, when the elongated grains either fall out by losing their equilibrium, or are tipped over by the conveyer E, thus working their way to the holes U, through which they pass along with the larger grains into the chute. The impurities, however, which are carried up in the cups, being smaller and more globular in form, are neither displaced by gravity nor the conveyer, but remain in the cups until the latter are above the apron on roller M, when the particles, having no longer a bottom to support them, fall through the cylinder, over the roller, into the trough P, and are discharged at the end by the conveyer Q.

It will be observed that, in the operation of the separator, the grain is kept by the conveyer D in the reel on the side opposite the trough, and the apron on that side is highest. The object of this is to give the contents of the cylinder a longer time to fill the cups, and thus secure the best attainable results.

All the necessary operating parts of this machine are made adjustable, and the cylinder is made of thick or thin material, according to the size of the grain and impurities to be eliminated.

Having thus described my invention, what I claim as new is—

1. The combination of the cylinder F, the transmitting friction-wheels $ff$, the reel $c$, and the adjusting-wheels $f'$, all constructed and arranged substantially as and for the purpose described.

2. The combination of the cylinder F and the oppositely-rotating screen C, having internal and external spiral conveyers D and E, substantially as and for the purpose described.

3. The combination of the adjustable rollers K and M with the endless apron O, roller I, and the cylinder F, substantially as and for the purpose described.

The above specification of my invention signed by me this 3d day of October, A. D. 1874.

HERMANN KURTH.

Witnesses:
SOLON C. KEMON,
CHAS. A. PETTIT.